Patented Nov. 5, 1946

2,410,418

UNITED STATES PATENT OFFICE 2,410,418

MODIFICATION OF ALKYD RESINS

Laszlo Auer, South Orange, N. J.

No Drawing. Application October 12, 1942,
Serial No. 461,799

3 Claims. (Cl. 260—22)

GENERAL FIELD OF INVENTION AND STATEMENT OF OBJECTS

This invention relates to the treatment of alkyd resins with modifying agents, whereby to alter the properties and characteristics of such resins. The present application is a continuation-in-part of my copending applications Serial No. 318,650, filed February 12, 1940, now Patent 2,298,270, issued October 13, 1942, and Serial No. 386,371, filed April 1, 1941, now Patent 2,311,200, issued February 16, 1943.

Alkyd resins are of many types, all being esters, most commonly esters of polyhydric alcohols, such as glycerine, with mixtures of monobasic and polybasic acids.

Other polyhydric alcohols may also be used in the preparation of the alkyds, such as glycols, pentaerythritol, mannitol, sorbitol, etc.

Most usually, the polybasic acids are phthalic acid and maleic acid, commonly used in the form of their anhydrides. However, other polybasic acids and anhydrides are also sometimes used in alkyd resin manufacture.

The monobasic acids usually employed in alkyd resin manufacture are the high molecular fatty acids and/or natural resin acids, such as rosin.

The alkyd resins may be classified in various different ways depending upon their constituents and properties and for some purposes certain characteristics are important, while for other purposes, other characteristics are important.

For instance, the esters of maleic acid and phthalic acid with glycerine are infusible and insoluble in organic solvents, after they have been heated for some time at elevated temperatures. Such esters yield only brittle films, in view of which for some purposes, it is of importance to employ combined esters of polybasic acids and monobasic acids, in preparing alkyd resins. The monobasic acids employed, for instance, fatty acid and/or resin acid, impart improved solubility characteristics to the alkyds so that they may readily be dissolved in organic solvents, and thereafter used to advantage in the coating arts.

Alkyds containing relatively high percentages of phthalic anhydride or other polybasic acids are harder and less soluble in organic solvents than alkyds containing a larger proportion of fatty acid and/or resin acid. The type of alkyd containing larger proportions of polybasic acid are commonly referred to as "short oil" alkyds, the other type usually being identified as "long oil" alkyds.

The medium or long oil alkyds yield elastic and tough coatings and are important ingredients of various coating compositions.

In considering the nature of the alkyds to which the present invention is applicable, it might further be mentioned that various alkyd resins are sometimes classified according to their drying characteristics. Thus, some alkyds are non-drying, some are semi-drying and baking non-drying, some are semi-drying and baking alkyds, and some are air drying alkyds. Usually fatty acids of non-drying oils, such as fatty acids of castor oil, coconut oil and babassu oil, yield non-drying alkyds. On the other hand, when employing fatty acids of semi-drying oils, such as sunflower oil and soya bean oil, the alkyds secured are semi-drying alkyds, useful for baking finishes and other purposes. Employment of fatty acids of drying oils, such as those of tung oil, linseed oil and dehydrated castor oil, yield alkyds having air drying properties.

Although various procedures have been employed in the production of alkyds, and although many different catalysts have been employed in alkyd resin manufacture, I have found that the preformed alkyds may be treated according to the present invention, thereby modifying the physical and/or other characteristics of the alkyds. For instance, the physical consistency may be changed appreciably, as may also the acid value and other properties.

In referring to changes in characteristics and properties, and in making comparisons of the modified alkyd resins with resins not treated with modifying agents as used in the present process, it is to be understood that the statement regarding changes and comparisons are always made on the basis of a relation between the product treated with a modifying agent and a product treated in exactly the same manner, heating, etc., but without a modifying agent. The latter is often herein referred to as a "blank" or "control" experiment.

As is mentioned in my copending applications above referred to and also in others referred to hereinafter, I believe alkyd resins to be organic isocolloids, i. e., colloidal systems in which the dispersed phase and the dispersion medium are both of the same chemical composition though present in different physical states.

At least most of the alkyds containing fatty acids behave similarly under treatment according to the present invention, as do fatty oils, many examples of fatty oil treatment with modifying agents being disclosed in copending applications elsewhere referred to herein.

By the modification process of the present invention, I believe the relative proportions of dispersed phase and dispersion medium are altered, thereby altering the properties, and notably the physical consistency of the modified alkyd product.

Other properties of the alkyds which may be altered and improved according to the present invention, are solubility characteristics, drying properties, and bodying time (of the alkyd). Moreover, treatment with various of the modifying agents also yields alkyds having improved weather, water and alkali resistance, these properties being of especial importance in coating compositions such as paints and the like.

The nature of the modifying agents employed according to the invention is considered just below but it is here first pointed out briefly that the process involves dispersion of the modifying agent in the alkyd resin and heating the mixture for a time sufficient to alter the properties, as will further appear.

THE MODIFYING AGENT

As is mentioned in my copending applications above identified, I believe that the colloidal system of organic isocolloids may be modified by means of modifying agents. According to the invention, such modifying agents are polar compounds in general. By polar compounds I mean compounds having polarity in the molecule, thus including electrolytes. Examples are given below.

Polar compounds are of many different classes, many of which are defined in my copending applications. The type of modification secured by various groups of modifying agents and even by individual agents, may be quite different, many agents and groups producing results which are quite distinctive, although as before mentioned, I believe the polar compounds are all capable of influencing the colloidal system of alkyd resins in various of the respects already mentioned, and also in others.

One particular general classification of polar compounds is as follows:

Metal salts of inorganic acids
 Metal salts of organic acids
 Inorganic acids
 Organic acids
 Metallo-organic compounds
  Metal alcoholates
  Aryl-metal compounds
 Organic esters of inorganic acids
 Inorganic salts of organic bases
 Organic esters Amines also constitute a useful class, particularly the poly-amines, for instance, diamines. Examples of amines are benzidine, diphenylamine and alpha-naphthyl-amine.

Many of the compounds falling in certain classes mentioned above are also of the type which I have termed "two-radical" compounds, i. e., compounds having within the molecule an acidic inorganic residue and an organic residue. By an acidic inorganic residue I mean a residue capable of yielding an inorganic acid upon the addition of one or more hydrogen atoms, OH groups, or water molecules, or upon the application of heat.

Such two radical type compounds may desirably contain a sulpho-, halo- or nitro- group.

Typical examples of certain of the foregoing classifications are given just below:

Metal salts of inorganic acids (Formed by various combinations of the following:)

| Cations | Anions |
|---|---|
| Ammonium | Chloride |
| Lithium | Bromide |
| Sodium | Iodide |
| Barium | Carbonate—Bicarbonate |
| Calcium | Sulphate |
| Zinc | Bisulphate |
| Iron | Sulphite |
| Cobalt | Bisulphite |
| Lead | Nitrate |
| Manganese | Nitrite |
| Copper | Borate |
| | Phosphate |

Metal salts of organic acids (Formed by various combinations of the following:)

| Cations | Anions |
|---|---|
| Ammonium | Formate |
| Lithium | Acetate |
| Sodium | Oxalate |
| Barium | Citrate |
| Calcium | Salicylate |
| Zinc | Phthalate |
| Iron | Maleate |
| Cobalt | Naphthol-sulphonates |
| Lead | |
| Manganese | |
| Copper | |

Salts of organic amines

Diphenylamine trichloracetate
Diphenylamine hydrochloride
Diphenylamine hydrobromide
m-Nitroaniline hydrochloride
Trichloroaniline hydrochloride
Diphenyl amine sulphate
Diaminodiphenyl sulphate
Aniline sulphate
Amino-azo-benzene sulphate
4:4' diamino-diphenyl sulphide
Aniline hydrochloride

Inorganic acids

Carbonic acid
Hydrochloric acid
Hydrobromic acid
Hydriodic acid
Sulphuric acid
Sulphurous acid
Hydrosulphurous acid
Hydrosulphuric acid
Thiosulphuric acid
Nitric acid
Nitrous acid
Boric acid
Phosphoric acid
Hydrocyanic
Thiocyanic
Chlorsulphonic

Organic acids

Tartaric acid
Maleic acid
Acetic acid
Oxalic acid
Salicylic acid
Phthalic acid
Citric acid
Trichloracetic acid
Naphthenic acids

Metal alcoholates

Sodium amylate

Two-radical compounds

A. Containing nitro-group
- Nitrobenzene
- o-Nitrophenol
- p-Nitrophenol
- Dinitrobenzene
- Nitro-chloro-benzene
- Dinitro-chlorobenzene
- Dinitroaniline
- p-Nitro-acetanilide
- Nitrocresol carbonate
- m-Nitroaniline hydrochloride
- Ethyl thioether of 2-nitrobenzene
- Ethyl thioether of 2:4 dinitrobenzene
- Ethyl thioether of nitro-aminobenzene
- 2:4-dinitrobenzene
- Nitro-aminobenzene B. Containing sulpho- group
- Benzene sulphonic acid
- p-Toluene sulphonic acid
- 2:5 dichlorobenzen sulphonic acid
- m-Xylidine sulphonic acid
- p-Toluidine-m-sulphonic acid
- Naphthalene 2:6 sulphonic acid
- Beta-naphthol 1:5 sulphonic acid
- Beta-naphthol 3:6:8 sulphonic acid
- Beta-naphthylamine 3:6:8 trisulphonic acid
- 2:1 naphthylamine sulphonic acid
- 2:6 naphthylamine sulphonic acid
- 2-phenylamine-8-naphthol-6-sulphonic acid
- Methyl-p-toluene sulphonate
- Ethyl chlorosulphonate
- Benzene sulphonyl chloride
- p-Toluene sulphonyl chloride
- Naphthalene-1-sulphonyl chloride
- Dimethyl sulphate
- Diaminodihydroxy anthraquinone disulphonic acid C. Containing halo- group
- o-Dichlorobenzene
- p-Dichlorobenzene
- Trichlorobenzene
- Naphthalene tetrachloride
- Naphthalene trichloride
- Naphthalene hexachloride
- Naphthalene monochloride
- Nitro-chlorobenzenes, ortho, meta and para
- Nitro-dichlorobenzenes
- Chloro-dinitrobenzenes
- Monochlorobenzene
- Chlorinated diphenyl
- Pinene hydrochloride
- 4-chloro-o-anisidine
- p-Nitro-chloro-benzene
- Triphenyl-chloro-methane
- Benzyl chloride
- Benzoyl chloride
- Acetyl chloride
- Acetyl bromide
- Phthaloyl chloride
- Trichloroacetic acid
- Monochloroacetic acid
- Chloral hydrate
- Iodoform

Organic esters of inorganic acids
- Triphenyl phosphate
- Tricresyl phosphate and other alkylphenyl phosphates
- Nitrocresyl carbonate
- Ethyl chlorosulphonate
- Dimethyl sulphate

Peroxides
- Barium peroxide
- Magnesium peroxide
- Benzoyl peroxide

I have found certain groups of modifying agents to be particularly effective in the treatment of alkyd resins—for instance, the organic halo-compounds.

Hereinafter examples are given of the treatment of alkyd resins with modifying agents selected from various of the groups which are useful in accordance with the present invention, but before introducing specific examples, reference is now made to the treatment conditions employed.

TREATMENT CONDITIONS

Although the treatment conditions may be varied in accordance with a number of factors such as the particular alkyd being treated, the treating agent selected and the characteristics desired, in general, the treatment conditions should conform with the following:

With respect to temperature it is first noted that while some modification may be brought about by dispersing the modifying agent in the resin at normal room temperature, in general, the treatment temperature should be considerably above room temperature, and usually from about 200° C. up to about the boiling point or decomposition point of the alkyd resin. In most cases the temperature should not be above about 300° C., and for many purposes treatment between about 270° C. and 290° C., has been found effective.

Increase in temperature is usually accompanied by more rapid and/or more extensive modification although as just noted, the temperature is desirably kept below the point at which any decomposition occurs.

The duration of the heating will again depend somewhat on the materials used and the results desired. Usually the heating should be continued at least until thorough dispersion of the treating agent is obtained. Ordinarily it is found that treatment for a period of at least thirty minutes is required for this purpose and frequently the treatment should be continued for several hours, for instance, up to about three or five hours.

The quantity of modifying agent employed will also depend somewhat on the alkyd being treated, on the modifying agent selected and on the particular characteristics desired. For various purposes a relatively wide range is usable, for instance, from a trace such as .01% or .5% up to about 30%. Ordinarily, however, a range of from about 1 or 2% up to 10% will be found to be effective.

The nature of the atmosphere in contact with the reaction mass will influence the modification which occurs. For certain purposes, such as a light colored product, it may be desirable to exclude air from the reaction mass, in which event vacuum may be applied. Introduction of certain gases into the reaction vessel, blanketing the surface of the batch may also serve to exclude air.

Gases suitable for this purposes are nitrogen, $CO_2$, $SO_2$, $H_2S$, amongst others. On the other hand, gases released from the reaction mass may serve to exclude air, particularly where the reaction takes place in a closed vessel.

The reaction may also be carried out in the presence of air, for instance, in an open kettle, and if desired, super-atmospheric pressure may be employed for some purposes.

EXAMPLES

A number of examples of the modification of alkyds are given herebelow, all of these examples having been carried out with the same alkyd resin, so as to give comparative results. The alkyd resin was prepared in accordance with the following.

First, a resin of medium oil length was prepared in accordance with the following formulation:

|  | Gm. |
|---|---|
| Phthalic anhydride | 1,560 |
| Linseed oil fatty acids | 1,008 |
| Soya bean oil fatty acids | 672 |
| Glycerine | 912 |
|  | 4,152 |

Container: Closed aluminum kettle with agitator.
Gas used:
  $CO_2$ blanket throughout.
  $CO_2$ bubbled through after first half hour at heat.
  $CO_2$ bubbled through vigorously during last half hour at heat to remove some excess phthalic anhydride.
Reaction temperature: 240–245° C.
Time at heat: 2½ hours.
Product: Fairly light and is plastic.
Acid No.: 15.84 (phthalic anhydride not all removed).

In the above formula 1.75 mols (260 parts by weight) of phthalic anhydride was used for 1.00 mol (280 parts by weight) of fatty acids, of which 60% was linseed oil fatty acids and 40% soya bean oil fatty acids. 1.65 mols (152 parts by weight) of glycerine was used.

The foregoing medium oil alkyd was then diluted with linseed oil to yield a long oil alkyd, the following procedure being employed for that purpose.

1800 gms. of the above medium oil length alkyd resin and 1800 gms. of alkali refined linseed oil were heated together in an aluminum kettle to 170° C., where a complete mixture of both was reached and the product formed a clear heavy bodied oily material when cooled, dissolving easily in mineral spirits.

Each of the examples employed the foregoing long oil alkyd as starting material. The examples were all carried out under similar conditions, there being certain variations as is indicated in the table of comparative experiments below.

In all cases the resin and modifying agent were heated in a flask and $CO_2$ was introduced into the flask to form a blanket at the surface of the batch.

*Table of comparative experiments*

| Ex. No. | Agent | Percent | Heating curve and time | Color (Hellige) | Viscosity (Gardner) | Acid No. |
|---|---|---|---|---|---|---|
| 1 | p-Toluene sulphonic acid | 5 | 2 hr. at 290° | Black 1 | Paste | Not taken. |
| 2 | p-Toluene sulpho chloride | 5 | 2 hr. at 260°; ½ hr. at 290° | do | Very viscous | Do. |
| 3 | Benzidine | 5 | 1½ hr. at 270°; 1½ hr. at 290° | Turbid brown granular 4 | Paste | Do. |
| 4 | Tri-chloro-acetic acid | 5 | 1 hr. at 270°; 1½ hr. at 290° | Clear 8 | Z–3 | 9.5. |
| 5 | Chloral hydrate | 5 | 2½ hr. at 270° | Clear 11 | Z–1 | 7.1. |
| 6 | Zinc carbonate / Barium peroxide | 2½ / 2½ | 2 hr. at 280° | Brown turbid 4 | Paste | Not taken. |
| 7 | Zinc carbonate / Barium peroxide | 5 / 5 | 2 hr. at 280° | do | do | Do. |
| 8 | Tetra-chloro-resorcinol | 5 | ½ hr. at 270°; 2½ hr. at 290 | Clear 7 | Z–5 | 20.8. |
| 9 | Diphenyl-amine | 5 | 3 hr. at 270° | Clear 10 | Z–1 to Z–2 | 7.8. |
| 10 | p-Nitro phenol | 5 | 2 hr. at 270° | Black 3 | Very viscous | Not taken. |
| A | (Alkyd resin without any treatment) |  |  | Clear 12 | Moderately viscous oil | 8.0. |
| B | (Heated without agent) |  | 1 hr. at 270°; 1½ hr. at 290° | Clear 9 | Z–2 | 5.4. |

The products of all of the foregoing examples were mixed with mineral spirits to yield 50% non-volatile compounds. These mixtures were then analyzed and compared in connection with certain properties thereof, the results being as follows.

Although the materials containing the resin products of Examples 1, 2, 3, 6, 7 and 10 were not fully compatible with mineral spirits, the others formed satisfactory solutions. The products of Examples 4, 5, 8, and 9 were very good with respect to clarity and color.

Subsequent agitation of the materials containing the products of Examples 1 and 10 yielded satisfactory solutions.

The products of Examples 3, 6 and 7 formed soap-like compounds, which compounds may have been salts of phthalic acid, having reduced solubility both in mineral spirits and also in that portion of alkyd resin which is still in ester form.

The treatment with tetra-chloro-resorcinol (Example 8) indicated considerable acceleration of bodying time in the preparation of the modified resin.

A test for solubility was also made on the products of Examples 1 and 10 in Solvesso No. 2, and these displayed satisfactory solubility characteristics in Solvesso No. 2.

Still further, the mineral spirits solutions with the products of Examples 4, 5, 8 and 9 were tested for drying properties after adding 0.03% cobalt, 0.3% lead and 0.02% manganese drier. These tests showed that the solutions containing the products of Examples 4, 5 and 8 were appreciably superior to a similar test which was made on the product of Example B above, the solution containing the product of Example 5 being the best of the group.

The drying test on the solution containing the product of Example 9 indicated that the modifying agent (diphenyl-amine) retarded drying, as compared with the Blank B.

VARIABLE AND SUPPLEMENTAL TREATMENT CONDITIONS

In addition to treatment at various different pressures, as above noted, the process of modification may be carried out in the presence of various gases, such for instance, as $CO_2$, $SO_2$, $H_2S$ and nitrogen. Such gases may either be bubbled through the reaction mass or may be employed as a blanket upon the surface of the reaction mixture, and may be used for their supplemental effect upon the primary treatment taking place.

The modifying agent may, if desired, be produced in situ, by introducing materials which will react under the conditions of treatment to produce the modifying agent desired. Various of the agents may also be used in combinations, or sequentially.

It is further to be noted that in general increasing any one or all of the variables: namely, temperature, time of treatment and percentage of modifying agent, increases the extent of modification. It will be understood that the foregoing is a general rule normally applicable within the ranges of operation above indicated, although, as to at least some variables, there may be limits beyond which the general rule does not apply. For instance, excessive increase in temperature may substantially alter the character of the process.

The modified product of this invention may if desired, be subject to other treatment, depending upon the use for which it is intended. Thus, for example, the modified products may be vulcanized with sulphur.

Light treatment and wave treatment of various types also influence the reaction, for instance, treatment with visible light, ultra violet light or with electrical potential differences. Irradiation with oscillating energy of various wave lengths, X-ray, etc., may also be used.

Various of the foregoing and other variations in treatment may be employed, as is mentioned in my copending applications above identified. Such supplemental matters need not be considered in detail herein, since reference may be made for that purpose to said copending applications, and also to certain other prior applications mentioned herebelow, all of which disclose certain features in common with the present application—to wit: Serial No. 359,425 (now Patent No. 2,213,944); Serial No. 446,172 (now Patent No. 2,213,943); Serial No. 446,170 (now Patent No. 2,234,949); Serial No. 370,733 (now Patent No. 2,083,550); and Serial No. 143,786 (now Patent No. 2,189,772).

Some of the modifying agents may act as dissolution promoting agents, as described in various of my prior applications and also in my issued Patent No. 2,293,038.

In the art of alkyd resin manufacture it is a known fact that 1 mol glycerine is never able to esterify with the theoretical quantity of 1½ mols of phthalic anhydride. Instead the quantity of phthalic anhydride is usually in the range of 1.1 to 1.3 mols of phthalic anhydride for each mol of glycerine. The phthalic anhydride is completely esterified under such circumstances, as the acid value of the resin is low, but the glycerine molecules have some free hydroxyl groups left. On the other hand 1 mol of glycerine esterifies with the theoretical quantity of 3 mols of fatty acids. Therefore when theoretical yields of alkyd resins are figured, it is customary to assume, that each mol of phthalic anhydride will liberate 1 mol of water and that excess OH-groups of the additional glycerine present remain unchanged. 1 mol of glycerine and 3 mols of fatty acids will liberate 3 mols of water of esterification.

Based on these well known facts, the constitution of the resin used in the examples of this specification is as follows:

In the "first step" resin of the examples 1680 grams of fatty acids are used, being equivalent with about 6 mols of fatty acids (molecular weight of fatty acids being about 280). These fatty acids combine with 2 mols of glycerine, i. e., 184 grams, yielding 1756 grams of glyceride and 108 grams of water of esterification. The phthalic anhydride combines with the rest of the glycerine, forms 186.3 grams of water of esterification and yields 2101.7 grams of glycerol phthalate. The theoretical yield of resin is 3,857.7 grams and the fatty acid glyceride in same is 45.50%. This resin is extended with equal weight of oil, so that the long oil alkyd, forming the starting point of the examples has approximately 27.25% glycerol phthalate and 72.75% fatty acid glyceride.

I claim:

1. A process in accordance with claim 3 in which the heating is effected under vacuum.

2. A process in accordance with claim 3 in which the temperature of treatment is between about 270° C. and 290° C.

3. A process for altering the properties of long oil alkyd resins which comprise about 73% fatty oil acid glycerides and about 27% glycerol phthalate, which process comprises the incorporation in the long oil alkyd resin of from about 0.5% to about 10% of p-toluene sulpho chloride and heating the mixture to a temperature between about 260° C. and the boiling or decomposition point of the mixture, whichever is lower, until a material is produced which manifests a substantial increase in viscosity, as compared to the same long oil alkyd resin heated in the same way but without the incorporation of the p-toluene sulpho chloride.

LASZLO AUER.